(12) United States Patent
Tucey et al.

(10) Patent No.: US 11,573,998 B2
(45) Date of Patent: *Feb. 7, 2023

(54) LYRIC SEARCH SERVICE

(71) Applicant: Apple Inc., Cupertino, CA (US)

(72) Inventors: Nicholas A. Tucey, Los Gatos, CA (US); Peter Leong, Mountain View, CA (US); Venkatakrishnan S. Sundaranatha, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/445,189

(22) Filed: Aug. 16, 2021

(65) Prior Publication Data

US 2022/0035852 A1 Feb. 3, 2022

Related U.S. Application Data

(63) Continuation of application No. 16/257,986, filed on Jan. 25, 2019, now Pat. No. 11,106,722.

(60) Provisional application No. 62/668,192, filed on May 7, 2018.

(51) Int. Cl.
*G06F 16/435* (2019.01)
*G06F 16/438* (2019.01)
*G06F 16/2457* (2019.01)
*G06F 16/43* (2019.01)

(52) U.S. Cl.
CPC ...... *G06F 16/435* (2019.01); *G06F 16/24578* (2019.01); *G06F 16/43* (2019.01); *G06F 16/438* (2019.01)

(58) Field of Classification Search
CPC .. G06F 16/435; G06F 16/24578; G06F 16/43; G06F 16/432; G06F 16/48; G06F 16/483; G06F 16/487; G06F 16/489; G06F 16/40
USPC ........................................... 707/728
See application file for complete search history.

(56) References Cited

U.S. PATENT DOCUMENTS

| | | | |
|---|---|---|---|
| 8,468,144 B2 | 6/2013 | Xu | |
| 8,489,604 B1 | 7/2013 | Sadovsky et al. | |
| 8,688,679 B2* | 4/2014 | Lalji | G06F 16/951 707/707 |
| 2009/0228777 A1* | 9/2009 | Henry | G06F 16/40 707/999.005 |
| 2014/0059062 A1* | 2/2014 | Ahn | G06F 16/245 707/756 |

(Continued)

*Primary Examiner* — Dung K Chau
(74) *Attorney, Agent, or Firm* — Dickinson Wright RLLP

(57) ABSTRACT

This application relates to a client-server architecture that enables search queries to be applied to transcription information for multimedia files. A server device implements a service configured to query a search platform to retrieve results associated with a plurality of multimedia files stored in a content database. The results are ordered according to a plurality of heuristic values calculated based on a text relevance analysis. The service is configured to modify the heuristic values to adjust an order of the results, and generate a response to a search request that includes a representation of at least a portion of the transcription information of the multimedia files referenced by the results. The heuristic values are modified based on at least one of a popularity score for a corresponding multimedia file, a weight associated with a particular field, or a relevance score based on feedback signals.

20 Claims, 12 Drawing Sheets

(56) References Cited

U.S. PATENT DOCUMENTS

| | | | |
|---|---|---|---|
| 2014/0095697 A1 | 4/2014 | Killow et al. | |
| 2014/0129694 A1* | 5/2014 | Aoun | G06F 16/35 709/224 |
| 2017/0046339 A1* | 2/2017 | Bhat | G06F 16/433 |
| 2018/0041462 A1* | 2/2018 | Halt | H04L 51/10 |
| 2018/0160189 A1 | 6/2018 | Engineer | |

* cited by examiner

US 11,573,998 B2

LYRIC SEARCH SERVICE

CROSS-REFERENCE TO RELATED APPLICATIONS

The present application is a continuation of U.S. application Ser. No. 16/257,986, filed Jan. 25, 2019, entitled "LYRIC SEARCH SERVICE," set to issue Aug. 31, 2021 as U.S. Pat. No. 11,106,722, which claims the benefit of U.S. Provisional Application No. 62/668,192, entitled "LYRIC SEARCH SERVICE," filed May 7, 2018, the contents of all of which are incorporated by reference herein in their entirety for all purposes.

FIELD

The described embodiments relate generally to search services. More particularly, the present embodiments relate to querying transcription information related to multimedia files stored in a content database.

BACKGROUND

Search algorithms have been developed that are uniquely tailored for querying large datasets based on text-based data contained within a data repository. Text-based search fails when the dataset is represented in another format. For example, audio files are typically searched based on metadata associated with the audio file (e.g., filename, artist, song title, etc.), but the search fails to compare a query string to audio waveforms within the audio file.

In some cases, specialized services have been developed that can compare a query based on an audio snippet with a repository of audio files, searching for a match of the audio snippet to the audio waveforms within the audio files. However, these services cannot match a text-based query string with the content contained within the audio waveform in the audio files. Consequently, a user cannot easily search for a song based on the lyrics of the song.

The best that a user can typically do is perform a text-based search on the Internet and hope that the query matches a transcription of the lyrics in a song that is published on a website. Once the user has the information about the song, they can then perform another search to locate an audio file of the song within a data repository maintained by a music sharing service.

SUMMARY

This paper describes various embodiments that relate to a client-server architecture that enables search queries to be applied to transcription information for multimedia files. More specifically, a query string can be compared with transcription information related to multimedia files in a content database to return a list of results that specifies multimedia files that match the query string.

In some embodiments, a service receives transcription information for a plurality of multimedia files included in a content database. The service populates a document with data for a number of fields. The fields include data sourced from metadata included in the multimedia file as well as data from the transcription information. The document is transmitted to an indexing service that parses the document and adds references to the media file to one or more indices maintained by a distributed search platform.

The distributed search platform maintains a separate index for each of a plurality of fields populated in the transcription document for the multimedia files. The distributed search platform receives a query for a particular index and returns a list of references that match the query. A query service is configured to generate queries of one or more indices maintained by the distributed search platform, each query returning a list of references to multimedia files in the content database that match the query string within a particular field of the transcription document.

In some embodiments, the distributed search platform calculates the heuristic values for at least some of the results by performing a text relevance analysis on the transcription information for the results based on one or more tokens in a query string. The text relevance analysis can comprise calculating a measurement of a token frequency included in transcription information. The text relevance analysis can comprise calculating a measurement of a term frequency—inverse document frequency (TF-IDF) for the transcription information. The text relevance analysis can comprise calculating a measurement of a token proximity within the transcription information.

In some embodiments, the heuristic values for at least some of the results are modified based on a popularity score for corresponding multimedia files. In other embodiments, the heuristic values for at least some of the results are modified based on a weight associated with each of a plurality of fields included in a corresponding transcription document. When the transcription information comprises song lyrics for audio files, the heuristic values for at least some of the results are modified based on weights corresponding to a particular field of the corresponding transcription document associated each audio file.

In some embodiments, the response to the search request includes a representation of a snippet of the transcription information that is selected based on the query string. The snippet can be selected from the transcription information by a snippet service configured to analyze the transcription information based on the query string.

In some embodiments, the response to the search request is transmitted to a client device. A feedback signal can be received from the client device. The feedback signal is utilized to compile a hint index that can be queried to generate a search hint to display in a graphical user interface of the client device. The search hint includes a snippet of the transcription information and an indication that the search hint is related to transcription information for the multimedia files.

In some embodiments, the multimedia files are audio files, and the content database is a music repository associated with a music sharing service. The transcription information represents song lyrics for the audio files stored in the music repository. In other embodiments, the multimedia files are video files, and the content database is a movie repository associated with a movie sharing service.

In some embodiments, the various functionality described herein can be implemented by one or more services implemented by a plurality of server devices connected via a network. A client device can be configured to communicate with one or more of the services in order to query the transcription information indexed within a distributed search database that maintains one or more indices related to transcription information and metadata for the multimedia files.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
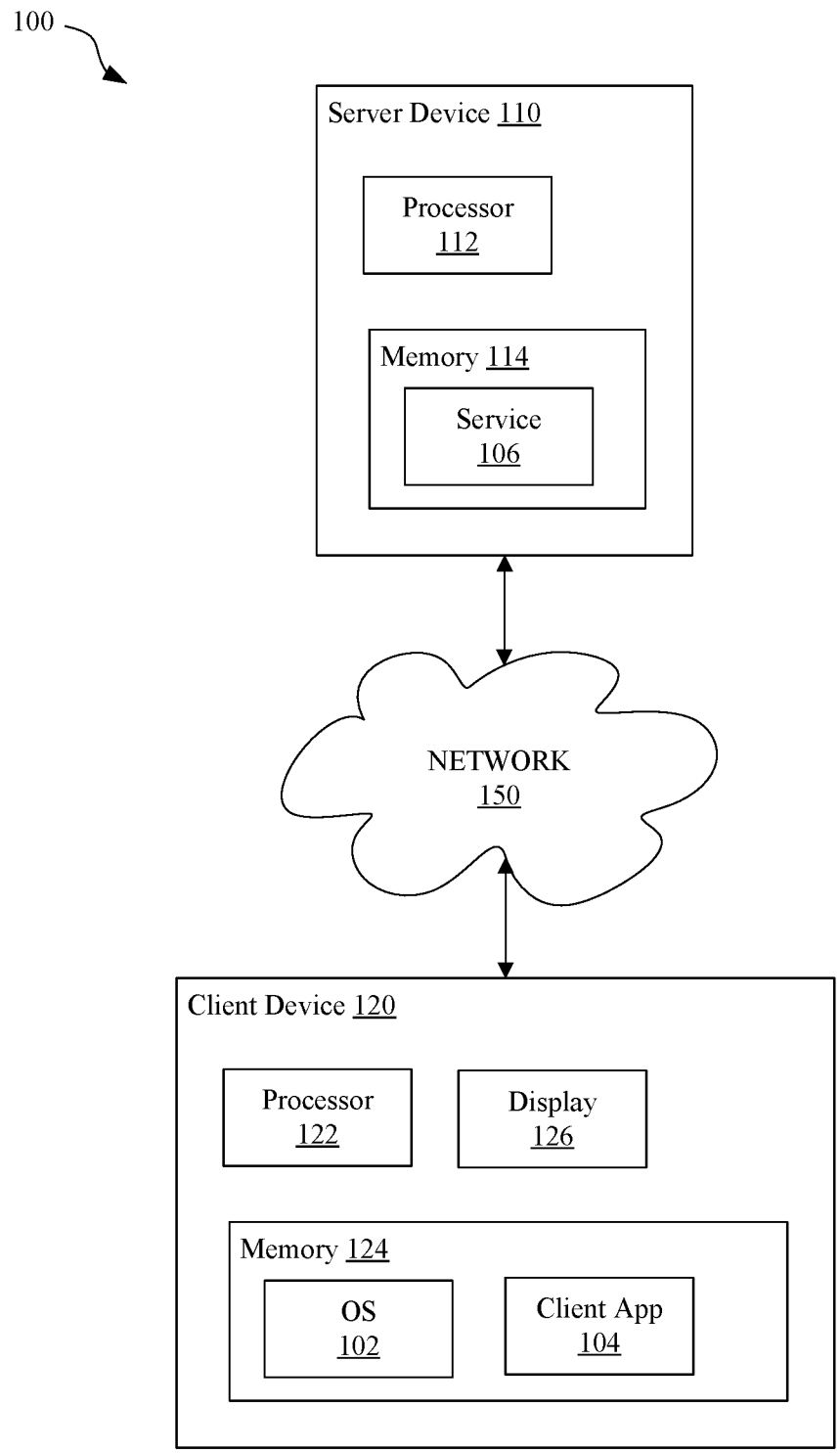
FIG. 1 illustrates a client-server architecture, in accordance with some embodiments.

Representative implementations of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In some embodiments, a service associated with a content database receives transcription information for multimedia files stored in the content database. The multimedia files can include any multimedia file that includes an audio track, such as audio files or video files. The audio track can be transcribed, either manually or automatically, to generate a text-based representation of the audio track. In the case where the audio track comprises a song that includes lyrics, the text-based representation of the audio track comprises a document that includes a text string that recites the lyrics of the song. The lyrics can include words, separated by line breaks or other special characters to denote logical breaks in the lyrics. Logical breaks can be identified based on timing of measures of the instrumental portion of the audio track or, alternatively, based on the interpretation of the lyrics during transcription such as by using instrumental or grammatical clues to determine the logical breaks in the song. For example, a song can be written to include verses and a chorus, each of the verses and the chorus containing one or more lines of lyrics having logical breaks between the lines as well as between the verses and chorus.

In some embodiments, the service, responsive to receiving the transcription information, populates a document with data for a number of fields. The fields include data sourced from metadata included in the multimedia file as well as data from the transcription information. The fields can also include a reference to a corresponding multimedia file within the content database. The document is transmitted to an indexing service that parses the document and adds references to the media file to one or more indices maintained by a distributed search platform.

In some embodiments, the transcription documents are indexed into a distributed search platform. More specifically, a separate index is generated for each field of the transcription document, the fields including at least one field for the transcription information and zero or more fields relating to the metadata for the multimedia files. For example, a separate index can be maintained for a title field, an artist field, and a transcription information field. A search query can be generated for the distributed search platform that is applied to each of the indices maintained by the distributed search platform. The search query includes a query string that includes a number of tokens.

In some embodiments, the distributed search platform generates results for the search query. The results for each of the queries of the one or more indices are aggregated into search results and ranked based on a heuristic value calculated for each reference in the results. The heuristic value can be calculated by the distributed search platform based on a text relevance analysis of the query string relative to the indexed information in each of the indices of the distributed search platform.

The results are transmitted to a service for further processing. In some embodiments, the service re-ranks the results based on considerations outside the scope of a text-relevance analysis. For example, the heuristic values associated with each of the references returned in the results can be adjusted based on a popularity score for the corresponding multimedia file in the content database. As another example, the heuristic values associated with each of the references returned in the results can be adjusted based on the field of the index that returned the particular result.

In some embodiments, the search results can be displayed on a client device. The representation of each result can include a relevant portion of the transcription information. A snippet service is utilized to analyze transcription information related to a multimedia file to generate a snippet of the transcription information related to a particular query string.

These and other embodiments are discussed below with reference to FIGS. 1-11; however, those skilled in the art will readily appreciate that the detailed description given herein with respect to these figures is for explanatory purposes only and should not be construed as limiting.

FIG. 1 illustrates a client-server architecture 100, in accordance with some embodiments. A server device 110 includes at least one processor 112 and at least one memory 114. A client device 120 includes at least one processor 122 and at least one memory 124. The client device 120 can also include a display device 126. The client device 120 is configured to communicate with the server device 110 via a network 150. The network 150 can be a wired or wireless network including a cellular network or packet-switched network such as the Internet.

As depicted in FIG. 1, the memory 124 of the client device 120 stores instructions executed by the processor 122. In some embodiments, the memory 124 of the client device 120 includes one or more applications configured to be executed by the processor 122 of the client device 120. The applications can include an operating system 102 that provides an operating environment for one or more additional applications. At least one application on the client device 120 can be a client application 104 that is configured to interact with services implemented by one or more server devices accessible via the network 150. Examples of a client application 104 can include, but are not limited to, an e-commerce application, a music sharing application, a fitness application, and the like.

The client device 120 can include a display device 126, such as a touch-sensitive, liquid crystal display (LCD) or a touch-sensitive, organic light emitting diode (OLED) display. An application executing on the client device 120, such as operating system 102 or client application 104, can include a graphical user interface (GUI) presented on the display device 126 that enables a user of the client device 120 to provide input to the application and view visual output presented by the application.

Figure 2:
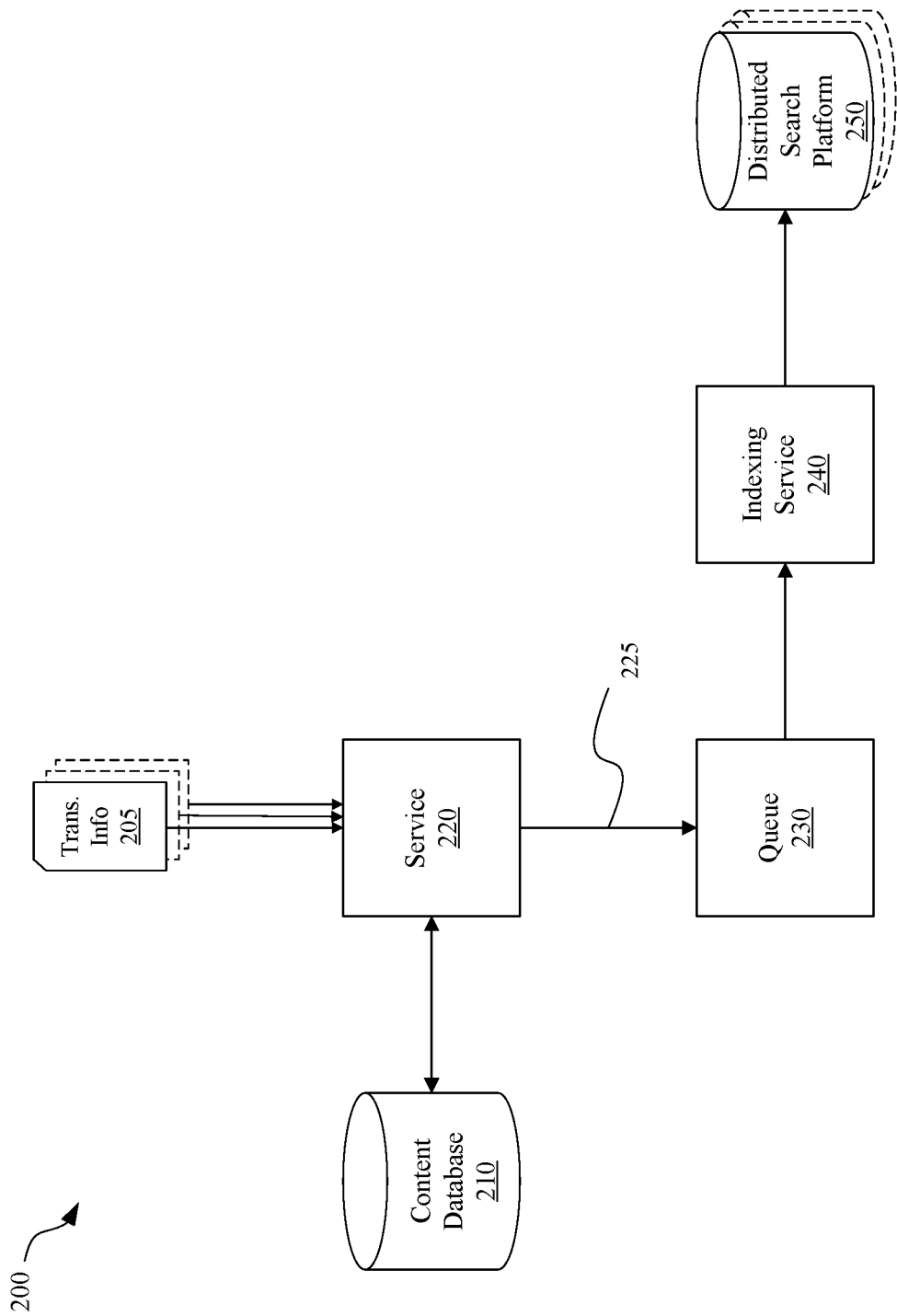
FIG. 2 is a conceptual view of a system for implementing a lyric search service, in accordance with some embodiments.

FIG. 2 is a conceptual view of a system 200 for implementing a lyric search service, in accordance with some embodiments. The system 200 includes a plurality of software components executed on one or more server devices 110. Each server device 110 can include at least one processor 112 and at least one memory 114 storing instructions for one or more software components. As depicted in FIG. 2, the software components can include a content database 210, a service 220, a queue 230, an indexing service 240, and a distributed search platform 250.

In some embodiments, the content database 210 is a distributed database configured to store multimedia content such as video files and/or audio files. The multimedia content can be encoded according to a well-known compression-decompression (CODEC) algorithm such as the Moving Picture Experts Group (MPEG) ver. 1/2 Audio Layer III (MP3) standard for audio files or the MPEG ver. 4 Part 10, Advanced Video Coding (MPEG-4 AVC or H.264) for video files. Other types of CODECS are contemplated for encoding multimedia content stored within the content database 210.

In some embodiments, each multimedia file added to the content database 210 can include metadata related to the multimedia file. The metadata can specify information for a number of fields such as a title, artist, year, genre, and the like. The metadata can be populated by a publisher of the multimedia file. This information can be populated by a producer of the multimedia file. In some embodiments, the metadata is included in an audio file as ID3 tags, which are data containers in an MP3 audio file formatted according to a standard format defined in an ID3 version 2 standard. Accessing the metadata is as simple as reading the containers included in the multimedia file. Alternatively, similar fields can be stored in the content database 210 along with the multimedia file such that the metadata is included in an entry of the content database 210. The metadata fields can be generated by the service 220 when new content is added to the content database 210.

In some embodiments, the service 220 enables the client device 120 to access resources managed by the service 220. The service 220 can implement an application programming interface (API) that can be utilized by the client application 104 on a client device 120 to interact with the service 220. For example, a web-based service can implement an API using a simple object access protocol (SOAP) or a representational state transfer protocol (REST) that enables the client application 104 to access and/or operate on resources associated with the service 220. The API can enable the client application to transmit data to and/or receive data from the service 220. API calls can also cause the service 220 to perform various operations and/or call additional back-end services using additional API calls.

In some embodiments, the service 220 can create an identifier for each multimedia file added to the content database 210. The identifier can enable various services within the system 200 to reference the multimedia file stored in the content database 210. In some embodiments, the identifier is a universally unique identifier (UUID) based on the Uniform Resource Name (URN) namespace defined in the Request For Comments (RFC) 4122 standard proposed by the Network Working Group of the Internet Engineering Task Force (IETF), which is herein incorporated by reference in its entirety. The UUIDs generated based on the RFC 4122 standard are 128-bit values that are unique to a particular multimedia file in the content database 210. In other embodiments, the identifier is simply an n-digit decimal integer such as, when n equals 6, a value between 000000 and 999999, which provides for storing up to one million unique multimedia files to be referenced in the content database 210. The value of n can be set based on the expected number of multimedia files to be added to the content database 210.

Conventional techniques for searching the multimedia files in the content database 210 can include performing a search based on the contents of the metadata for each file. For example, the multimedia files can be indexed by tokens included in text strings stored in the title tag, artist tag, genre tag, and so forth in the metadata for the multimedia file. However, these metadata tags are insufficient to search a multimedia file based on transcription information for the multimedia file. Transcription information can refer to lyrics of a song or monologue or dialogue from a movie. As used herein, the term "transcription information" refers to generally a text-based representation of language included in an audio track of the multimedia file. In the case of audio files corresponding to a song, the transcription information refers to a text-based representation of the song lyrics.

In some embodiments, the service 220 is configured to receive transcription information 205 corresponding to a multimedia file stored in the content database 210. The transcription information 205 can be a file that includes ASCII text that represents, e.g., the lyrics for a song or spoken portions (e.g., monologue and dialogue) of a movie. The transcription information 205 can be provided by a publisher of the multimedia content, transcribed manually by a third-party, or transcribed automatically using speech recognition to translate the audio waveform within an audio track into text in a particular language.

In some embodiments, the speech recognition can be performed utilizing a machine learning algorithm to process the audio waveform in an audio track to determine whether the audio file includes any spoken language, which are transcribed into a text file. In some embodiments, the audio track of the multimedia file can be parsed into smaller portions of the audio track and provided as input to a classifier algorithm that provides a plaintext version of the token(s) included in the portion of the audio track.

The service 220 generates a transcription document 225 corresponding to a multimedia file in the content database 210. The transcription document 225 includes a number of fields storing data related to the multimedia file. The fields can include, but are not limited to: a file identifier field that includes a reference to a corresponding multimedia file; one or more fields storing data parsed from the metadata for the multimedia file; and one or more fields storing versions of the transcription information associated with the multimedia file. A more detailed description of the transcription document 225 is provided below with reference to FIG. 3.

In some embodiments, the service 220 adds the transcription document 225 to a queue 230 to be passed to an indexing service 240 associated with a distributed search platform 250. The queue 230 enables the service 220 and the indexing service 240 to operate asynchronously. In some embodiments, the queue 230 is an Apache® Kafka distributed streaming platform implemented on one or more server devices 110.

In some embodiments, the indexing service 240 monitors the queue 230 for available transcription documents 225. The indexing service 240 pops a transcription document from the queue 230, when available, and adds the transcription document 225 to the distributed search platform 250. In some embodiments, the distributed search platform 250 indexes the data in different fields of the transcription document into different indices maintained by the distributed search platform 250. Each index maintained by the distributed search platform 250 can be queried independently based on a query string included in the search query.

In some embodiments, a query string includes a number of tokens. As used herein, a token can refer to a word within the query string that can include multiple words separated by white space. More generally, a token refers to one or more characters that, when combined, have a particular meaning within a given language. For a particular field in the transcription document 225, the indexing service 240 parses the data for that field and adds an identifier of the transcription document 225 to an entry in a corresponding index maintained by the distributed search platform 250 for each unique token included in the data for the field. The transcription document 225 can also be stored in the distributed search platform 250.

In some embodiments, the distributed search platform 250 can comprise the Apache® Solr enterprise search platform. The distributed search platform 250 can be implemented on a cluster that includes a plurality of server nodes. A server node can refer to a server device 110. Alternatively, a server node can refer to a virtual machine (VM), where one or more VMs are managed by a hypervisor executing on a server device 110, the cluster comprising a plurality of server devices 110, each server device 110 executing one or more VMs.

The distributed search platform 250 can include logic for creating and maintaining indices for different fields of the transcription documents 225. An index refers to a database or other data structure that maps of tokens to transcription documents that include at least one instance of the token within a given field. Each indexed token can be associated with multiple transcription documents, and each transcription document can be indexed according to multiple tokens included in a particular field. Each index can be queried to determine which transcription documents 225 contain particular tokens in the query string within a given field of the transcription documents 225.

Figure 3:
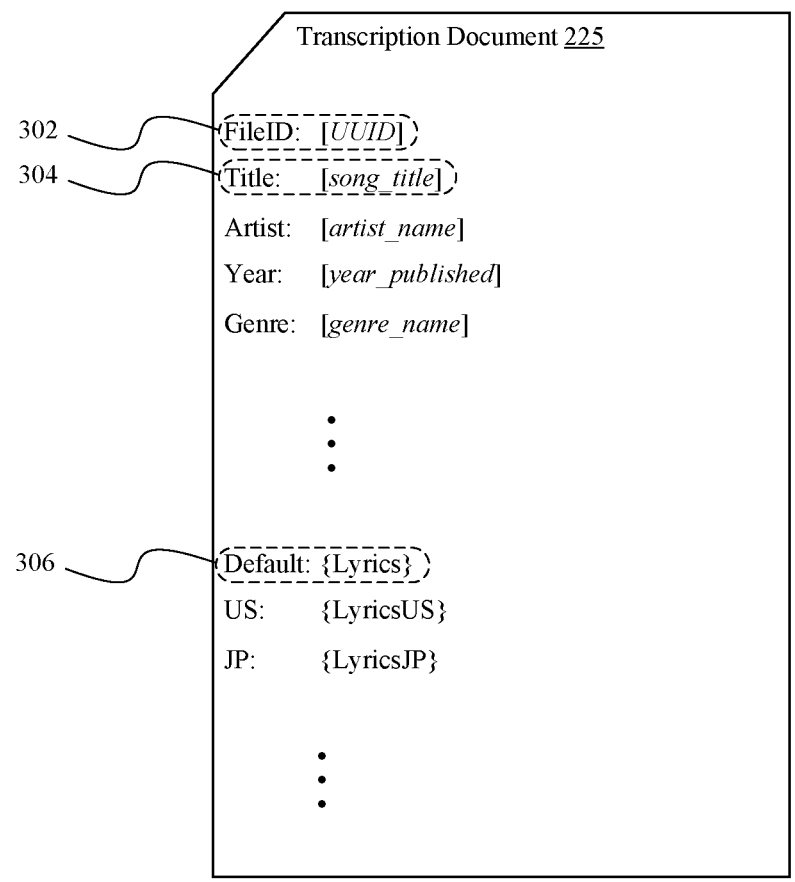
FIG. 3 illustrates a transcription document, in accordance with some embodiments.

FIG. 3 illustrates a transcription document 225, in accordance with some embodiments. The transcription document 225 can include metadata information corresponding to a multimedia file as well as one or more versions of the transcription information for the audio track of the multimedia file.

In some embodiments, the transcription document 225 includes a number of fields. Each field includes a label as well as a value for the field. As depicted in FIG. 3, the transcription document 225 includes a file identifier field 302 that stores a reference (e.g., an identifier) to the corresponding multimedia file stored in the content database 210. The transcription document 225 also includes one or more fields for metadata included in the multimedia file. For example, the transcription document 225 of FIG. 3 includes a title field 304 that stores the contents of a title ID3v2 tag parsed from the multimedia file. Additional fields for other metadata can be included in the transcription document, such as fields for artist, year, or genre, among others.

In some embodiments, the transcription document 225 also includes one or more fields for versions of the transcription information 205. A default transcription information field 306 stores the text of the transcription information 205 as received by the service 220. It will be appreciated that the lyrics of a song have copyrights attached thereto and, therefore, licenses are required to publish the lyrics in certain jurisdictions. In some instances, a service provider of the service 220 has licenses to publish the lyrics to a song worldwide and, therefore, the transcription document 225 can include one version of the transcription information 205 in the default transcription information field 306 that can be displayed worldwide. In some cases, the service provider does not have a license for a particular jurisdiction. For example, the service provider might have obtained a license to publish the lyrics in some jurisdictions but not in the United States. As such, the transcription document 225 includes an override transcription information field for the United States (or any other jurisdiction), where the lyrics for the song are blank, indicating that the service provider does not have a license to publish the lyrics in the United States.

In addition, in some jurisdictions, local laws may prevent certain lyrics from being published due to, e.g., obscenity laws or cultural norms. As such, the transcription document 225 includes an override transcription information field for Japan (or any other jurisdiction), where the lyrics for the song are censored as displayed in that jurisdiction. The service 220 generates the transcription document 225 based on the transcription information 205 and policies related to legal requirements in various jurisdictions.

In some embodiments, the distributed search platform 250 maintains a number of separate and distinct indices for each of a plurality of fields in the song document(s) 225. For example, a first index can store information related to a title field of the transcription document 225, a second index can store information related to an artist field of the transcription document 225, a third index can store information related to a default transcription information field (e.g., lyric data). Additional indices can be created for other fields in the transcription document.

Returning to FIG. 2, in some embodiments, the indexing service 240 receives a transcription document 225 and parses the value for each of the fields corresponding to the different indices of the distributed search platform 250. The indexing service 240 indexes the transcription document according to the tokens of each field. For example, if the title of a song is "Happy Birthday" then the indexing service 240 indexes the transcription document in a first index according to a first token ("happy") and a second token ("birthday"), the entries for each token in the index modified to include the reference to the document identifier for the transcription document 225. Consequently, any query string that includes either the first token or the second token will return a document identifier for the transcription document 225 in the search results that indicates that transcription document matches the query string.

It will be appreciated that lyrics for a song include a number of different lines of text, such that a given transcription document 225 will be indexed according to a number of distinct tokens that may number in the high tens or hundreds of tokens. Each token can be found one or more times in the default transcription information field 306 included in the transcription document 225. Some tokens may only be listed once whereas other tokens may be repeated many times within the transcription information. In some embodiments, the entries of the distributed search platform 250 for an index corresponding with the default transcription information field 306 include statistical information related to a token frequency and a list of positions of the tokens within the transcription information.

In some embodiments, tokens are normalized to be case insensitive. For example, characters can be modified to be lower case. In some embodiment, tokens associated with common words can be discarded. For example, common words such as "the", "of", "a", and the like are not utilized to index the transcription document 225 in the distributed search platform 250.

In some embodiments, the distributed search platform 250 is configured to perform text relevance analysis on a document being indexed in order to generate statistical data related to a particular token. The statistical data can include a number of times the token appears in the document (e.g., a token frequency), a measure of the percentage of tokens in the document that match the particular token, and/or a list of positions of the token within the document. This statistical data can be calculated when the document is indexed and stored in an entry of the distributed search platform 250 along with the document identifier for the transcription document 225.

Figure 4:
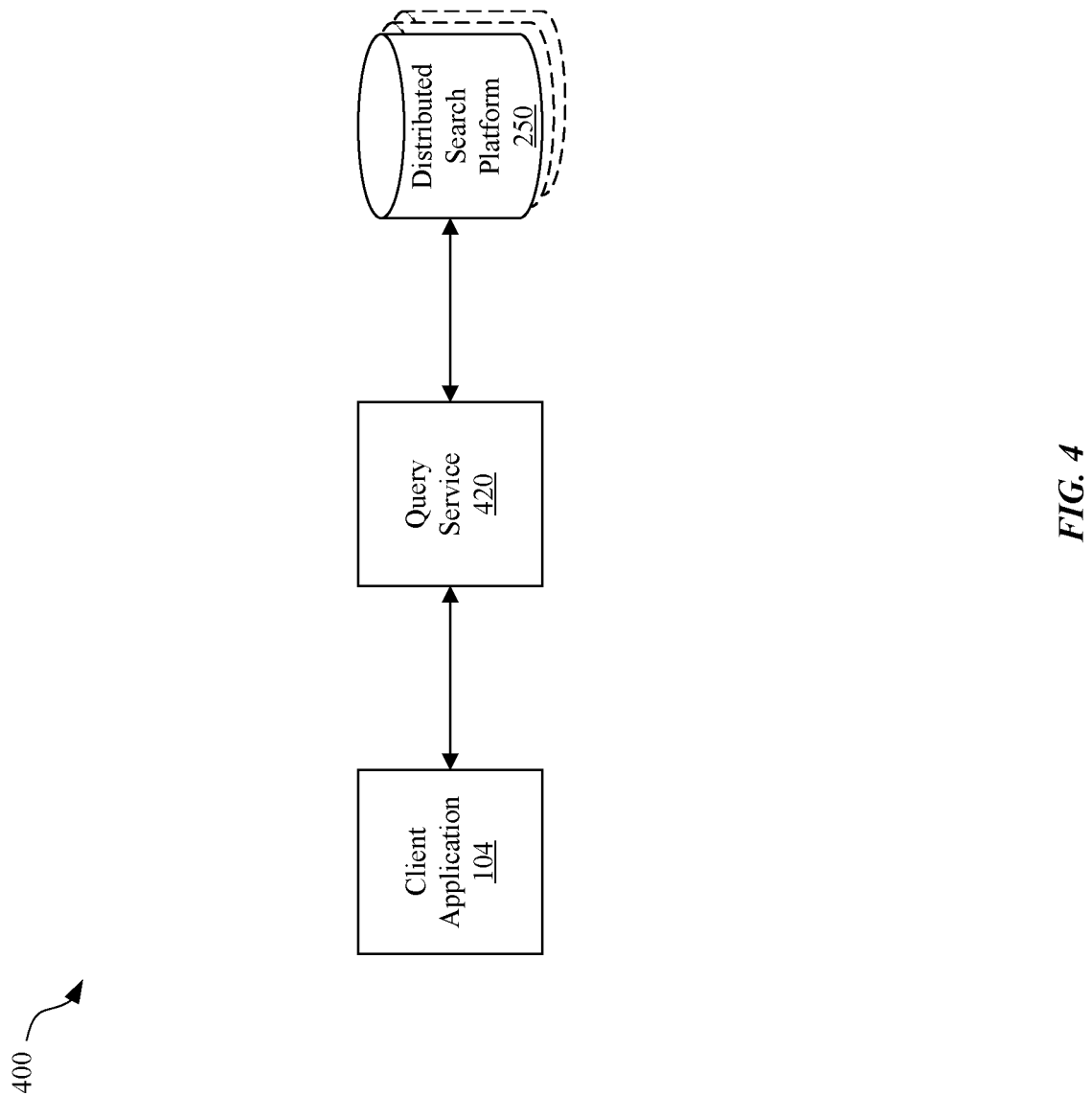
FIG. 4 illustrates a client-server architecture for performing a search based on transcription information, in accordance with some embodiments.

FIG. 4 illustrates a client-server architecture 400 for performing a search based on transcription information, in accordance with some embodiments. The client-server architecture 400 includes a client application 104, a query service 420, and the distributed search platform 250. The client application 104 is included in the memory 124 of the client device 120 and executed by at least one processor 122 of the client device 120. The query service 420 is included in a memory 114 of a server device 110 and executed by at least one processor 112 of the server device 110. The query service 420 is accessible by the client application 104 by way of a network 150 such as the Internet.

The query service 420 provides a front-end to the distributed search platform 250. The operation of the client application 104, the query service 420, and the distributed search platform 250 is described in more detail below with reference to FIGS. 5A-5B.

Figure 5A:
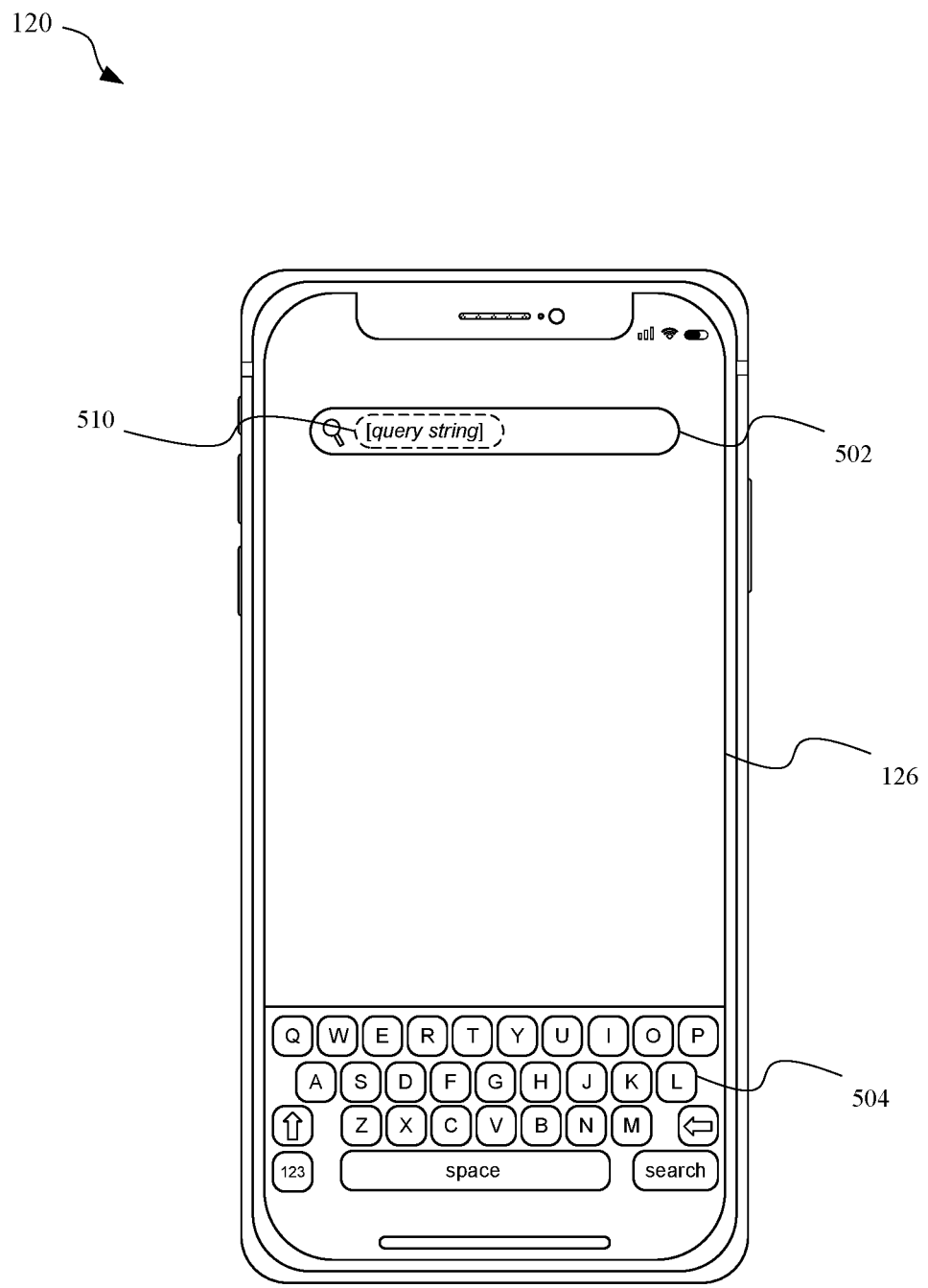
FIGS. 5A-5B illustrate a search query performed utilizing the client-server architecture of FIG. 4, in accordance with some embodiments.
Figure 5B:
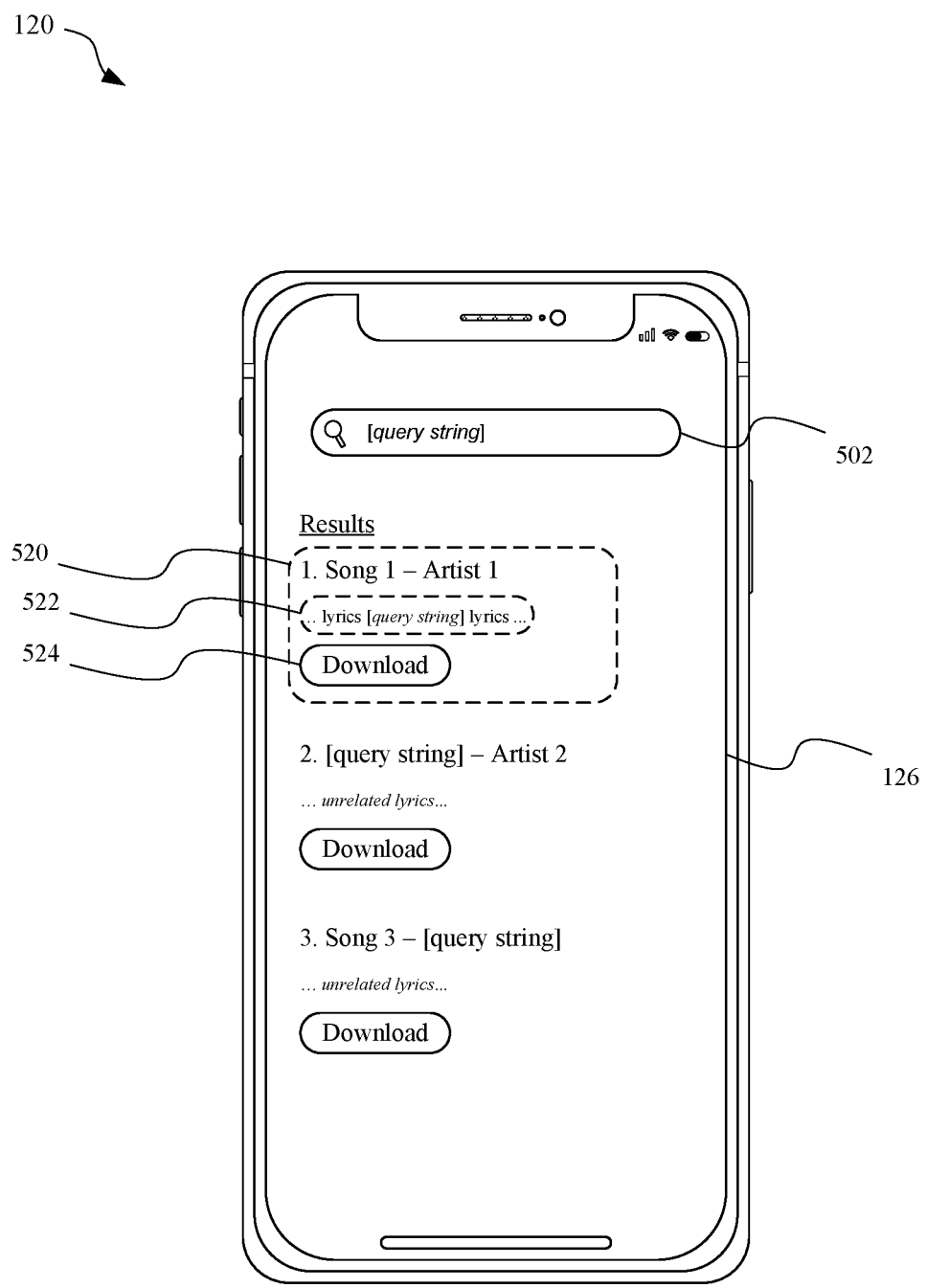

FIGS. 5A-5B illustrate a search query performed utilizing the client-server architecture 400 of FIG. 4, in accordance with some embodiments. As depicted in FIG. 5A, the client device 120 is a mobile device such as a cellular phone or a tablet computer. It will be appreciated that the client device 120 can include other types of client devices 120 such as a laptop computer, a desktop computer, a wearable device (e.g., a smart watch), a personal digital assistant, and the like. The client device 120 can execute an application that presents a GUI on the display device 126 of the client device 120. The GUI can include a search query interface element 502 that enables a user of the client device 120 to provide a query string 510 to the application. The GUI can also include a virtual keyboard 504 that enables a user of the client device 120 to type the query string 510 by touching portions of the display device 126 corresponding to virtual keys of the virtual keyboard 504.

In some embodiments, the search query interface element 502 is implemented in an operating system of the client device 120 and enables a user of the client device 120 to search for files stored in the memory 124 of the client device 120. In some embodiments, the query string 510 entered via the search query interface element 502 can be transmitted to the query service 420 via a network 150 in order to enhance the search results presented to a user to include resources that are not stored locally on the client device 120 but are nevertheless accessible to the client device 120 via the service 220.

In other embodiments, the search query interface element 502 is implemented in a client application 104 of the client device 120 and enables a user of the client device 120 to search for files stored in the memory 124 of the client device 120 or accessible over a network 150 via the service 220. For example, a client application 104, such as an e-commerce application, can be designed to include the search query interface element 502 to search for content available for download to the client device 120 via a service corresponding with the e-commerce application. As another example, a client application 104, such as a music sharing application, can be designed to include the search query interface element 502 to enable a user to search for songs available via a music sharing service.

In some embodiments, the client application 104 is a web-based application displayed within a browser of a client device 120. The client application 104 can include a series of resources (e.g., hypertext markup language (HTML) documents, images, scripts, etc.) requested from a web server associated with a website. The browser receives the resources and interprets the resources to display a representation of the website on the display device 126. The client application 104 is therefore platform-independent in that the client application 104 can be displayed on a plurality of different client devices 120 running different operating systems.

As depicted in FIG. 5A, a user enters a query string 510 in the search query interface element 502. The query string 510 is a character string including one or more tokens. The client application 104 processes the query string 510 to generate a search request. In some embodiments, the client application 104 optimizes the query string 510 such as by normalizing the tokens included in the query string and/or discarding common words from the query string, as described above.

In some embodiments, the query string 510 is inserted into an HTTP message that is addressed to a Uniform Resource Locator (URL) for the query service 420. In some embodiments, the query string 510 is included in the URL for an HTTP Get message. Alternatively, the query string 510 is included in the URL for an HTTP Post message. In some embodiments, the query string 510 is formatted as a JavaScript Object Notation (JSON) document that is included in the body of the HTTP message. It will be appreciated that other methods for transmitting the query string 510 to the query service 420, such as formatting the query string 510 as an Extensible Markup Language (XML) document, are contemplated as being within the scope of the present application.

In some embodiments, the query service 420 receives the query string 510 and generates one or more search queries for the indices of the distributed search platform 250. The distributed search platform 250 implements an API for querying the indexed documents in each of the one or more indices. The distributed search platform 250 processes each query and generates a result that is returned to the query service 420. In some embodiments, the result is a list of references to one of the transcription documents 225 indexed by the distributed search platform 250.

In some embodiments, the distributed search platform 250 is configured to parse the query string 510 to separate each of the tokens included in the query string. The distributed search platform 250 fetches a list of transcription documents 225 associated with each token in the query string 510, and generates a list of all documents that comprise an intersection (e.g., A ∩ B) of the lists of documents for each individual token in the query string 510. The result of the intersection is then provided as a list of results to the query service 420. In some embodiments, the query service 420 and/or the client application 104 can specify a maximum number of results to return in the list of results, such that the number of transcription documents 225 referenced in the list of results is capped. For example, the list of results can be capped at 100 transcription documents 225.

In some embodiments, the distributed search platform 250 can be configured to rank the results based on a text relevance analysis. A heuristic value can be calculated for each transcription document 225 in the list of results based on the relevance of the query string 510 to the corresponding field in the transcription document 225. The heuristic value can comprise a combination (e.g., sum, average, etc.) of a number of measurements or scores.

In some embodiments, the heuristic value comprises a measurement of a frequency of each token in the query string within a field of a given transcription document 225. Transcription documents 225 that include a token multiple times result in a larger heuristic value compared to transcription documents 225 that include a token only once. The heuristic value increases proportionally with increasing frequency. The frequency of each token in the query string 510 can be added together to find a composite frequency measurement for the query string 510. In some embodiments, the frequency for a given token is calculated as the total number of instances of the particular token in a given document divided by the total number of tokens in the document. The composite frequency can then be calculated by multiplying each frequency measurement for the tokens in the query string 510, and, optionally, normalizing the composite frequency based on the total number of tokens in the query string 510.

In some embodiments, the heuristic value comprises a measurement of a term frequency—inverse document frequency (TF-IDF) for a token. The TF-IDF is a weight that is proportional to token frequency in a given field of the transcription document 225 and inversely proportional to token frequency in the corpus of all transcription documents 225 indexed by the distributed search platform 250 for that field. For example, even though the token "love" may appear more frequently than other tokens in a particular transcription document 225, the token "love" may appear more frequently, in general, across all transcription documents 225 indexed by the distributed search platform 250 compared to other tokens, such that increased frequency related to the token "love" is less exceptional than increased frequency of more rare tokens. In some embodiments, token frequency is calculated as the total number of instances of the particular token in a given document divided by the total number of tokens in the document; and inverse document frequency is calculated as the natural logarithm of the total number of documents divided by the number of documents that include the token. The token frequency is multiplied by the inverse document frequency to calculate the TF-IDF.

In some embodiments, the heuristic value comprises a measurement calculated utilizing the BM25F best matching ranking function, sometimes referred to as Okapi BM25F.

In some embodiments, the heuristic value comprises a measurement of token proximity. Token proximity refers to how closely an order and proximity of tokens in the query string 510 matches an order and proximity of tokens in the field of the transcription document 225. For example, a query string of "happy birthday" will correspond to a high heuristic value for a transcription document 225 that includes the tokens "happy" and "birthday" adjacent within the field of the transcription document 225 compared to a document that includes "happy" in one portion of the field and "birthday" in another portion of the field separated by a large number of unrelated tokens.

The distributed search platform 250 calculates the heuristic value for each document in the list of results and ranks each document in the list of results according to the heuristic values. The distributed search platform 250 provides the ranked list of results to the query service 420. The query service 420 adjusts the ranking generated by the distributed search platform 250 as part of the text relevance analysis, as described in more detail below.

In some embodiments, the query service 420 promotes certain results over others based on popularity of the multimedia content. Popularity can be determined based on a number of times the multimedia content has been accessed or downloaded from the content database 210. Weights can be calculated for each transcription document 225 in the list of results based on a popularity score for the corresponding multimedia file, and then the heuristic value can be adjusted by multiplying the heuristic value by the popularity score or a normalized or quantized popularity score. Adjusting the heuristic values based on popularity score promotes results associated with popular content over other results associated with less popular content.

In some embodiments, the popularity score is only used to promote results over other results having the same heuristic value. In other words, popularity of the content is only utilized as a tie-breaker when the heuristic value cannot differentiate between two results. For example, if a query string for an artist matches multiple songs by a given artist, then the heuristic value for each of the results can be the same, and then the popularity score is utilized by the query service 420 to promote results related to popular songs of that artist over other songs by that artist in the ranking.

In some embodiments, the query service 420 can generate multiple queries based on the query string 510 for each of the different indices maintained by the distributed search platform 250. For example, a first query is provided to the distributed search platform 250 that searches for any transcription documents 225 having a title that matches, at least in part, the tokens in the query string 510; a second query is provided to the distributed search platform 250 that searches for any transcription documents 225 having an artist that matches, at least in part, the tokens in the query string 510; and a third query is provided to the distributed search platform 250 that searches for any transcription documents 225 having lyrics that match, at least in part, the tokens in the query string 510. The list of results for each query are then aggregated by the query service 420.

In some embodiments, the query service 420 adjusts the heuristic values included in the results returned by the distributed search platform based on the corresponding index that produced the results. More specifically, the query service 420 adjusts the heuristic values in the results by multiplying the heuristic values by a weight corresponding to each of the one or more fields of the transcription documents 225. For example, a query string that matches a title of a song or artist is more likely to be a relevant search result than a query string that merely matches a portion of the lyrics of a song. Therefore, the heuristic values for results based on the title index or the artist index are increased and/or the heuristic values for results based on the transcription information are reduced. By multiplying the heuristic value associated with each transcription document 225 in the list of results by a weight according to a field corresponding to the index of a given query, the aggregate list of results is re-ranked when compiled to promote results related to titles or artists over lyrics, for example. The weights corresponding to each field can be set manually, or can be dynamically adjusted based on, e.g., a feedback signal that represents which results are eventually selected by a user of the client application 104.

Once the list of results has been re-ranked (e.g., re-sorted) during aggregation by the query service 420, the query service 420 generates a response to the search request that is transmitted to the client application 104 of the client device 120. In some embodiments, the response is provided in an HTTP message transmitted from the server device 110 to the client device 120 via the network 150. The list of results can be formatted in a JSON document that can be parsed by the client application 104 and formatted according to a desired display preference of the client application 104. Alternatively, the list of results can be formatted in an HTML document that is configured to be displayed in a browser of the client device 120.

As described above, the list of results comprises a ranked list of document identifiers corresponding to transcription documents 225 indexed by the distributed search platform 250, each transcription document corresponding to a particular multimedia file in the content database 210. However, the document identifier for the transcription document 225 is typically of little interest to the client application 104. In fact, the document identifier for the transcription document 225 may be kept private within the scope of the server-side of the client-server architecture 400. In some embodiments, the query service 420 generates a response to the search query by compiling information related to a result from the transcription document 225. For example, the query service 420 can retrieve the transcription document 225 referenced by the document identifier in the result from the distributed search platform 250, read the title and artist for the multimedia file from the transcription document 225, and format a search result corresponding to the transcription document 225 that includes a text string that includes the title of the song and the artist of the song.

In addition, the search result can also include a snippet of the lyrics that is related to the query string 510. The query service 420 can call a snippet service, discussed in more detail below, which returns a portion of the transcription information to the query service 420 that most closely matches the query string 510. This snippet of the transcription information can be displayed along with the title and artist of the song.

The client application 104 displays the search results in a GUI of the client application 104. Each result includes information included in the fields of the transcription document 225 associated with the particular result. For example, as depicted in FIG. 5B, the search results can include, for a particular result such as result 520, information related to a song title, an artist, and a snippet 522 or sample of the transcription information. The search results can also include hyperlinks or other user interface elements such as virtual buttons 524 that enable a user to access or download the multimedia file from the content database 210.

In some embodiments, the query service 420 re-ranks results based on feedback signals received from the client application 104. The client application 104 displays the search results and users of the client application 104 interact with the displayed results. A feedback signal is generated by the client application 104 and sent back to the query service 420 based on which results are clicked (e.g., selected) by a user within the search results. The query service 420 can aggregate the feedback signals for a plurality of instances of a given query string, which provides a good indication of which results in the list of results are the most relevant for that query string. The query service 420 can compile a dataset from a large number of client devices 120 and users, for each particular query string, to indicate the most relevant search results for a given query string. The query service 420 can then re-rank the results in the list of results based on a relevance score calculated according to the compiled feedback signals. Certain results can be promoted if they are selected from the search results at high frequency. Other results can be demoted if they are selected from the search results at low frequency. For example, a default relevance score can be set equal to one, and the relevance score can be increased when a result is selected or decreased when a result is not selected, as indicated by the feedback signal. The relevance score can decay to zero over time if the result is infrequently returned in response to a given query string 510. The relevance score can then be multiplied by the heuristic value by the query service 420 prior to re-ranking the results in the list of results.

Figure 6:
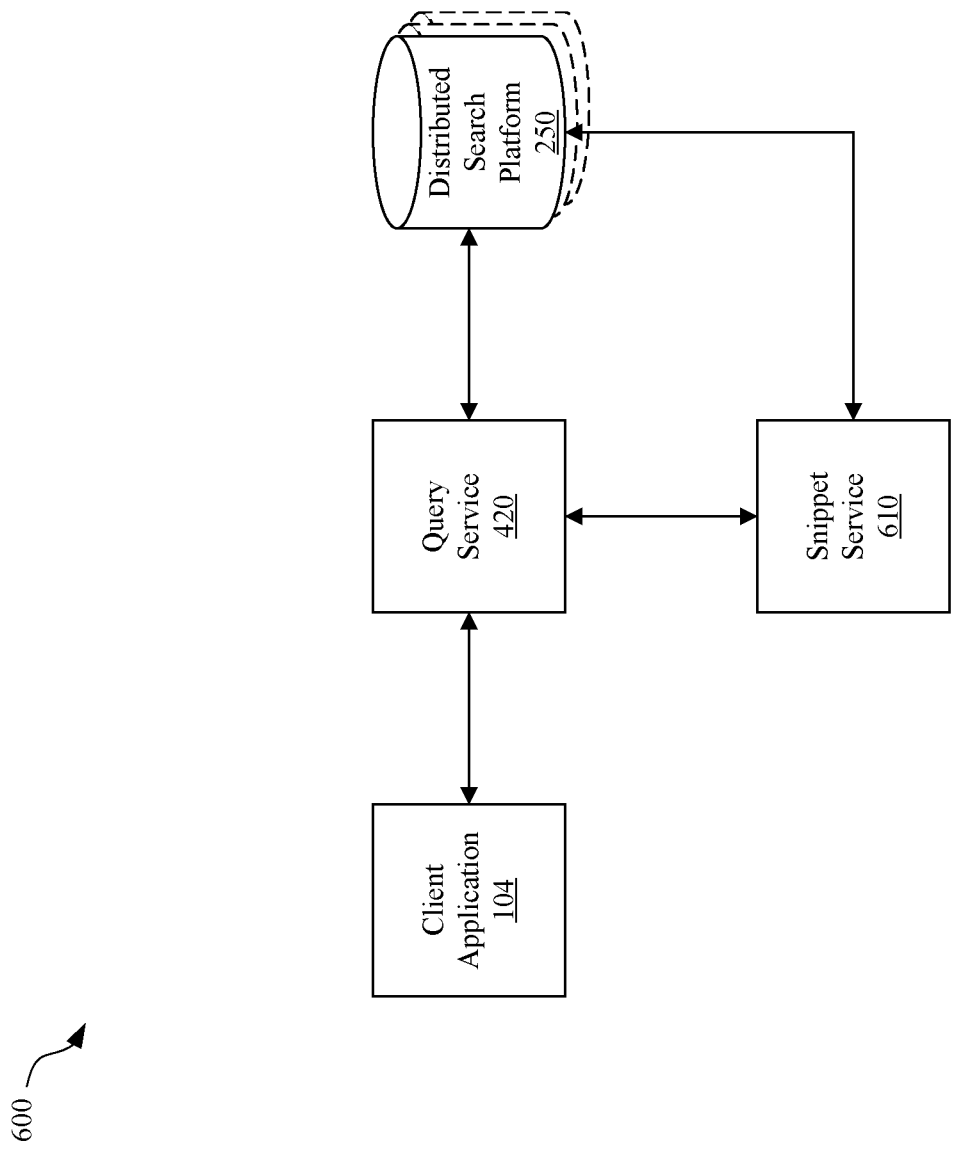
FIG. 6 illustrates a client-server architecture for generating search results including snippets of transcription information, in accordance with some embodiments.

FIG. 6 illustrates a client-server architecture 600 for generating search results including snippets of transcription information, in accordance with some embodiments. The client-server architecture 600 is similar to client-server architecture 400 except that a second, back-end service, the snippet service 610, is utilized by the query service 420 to generate snippets of transcription information for each result returned by the distributed search platform 250 in the list of results. The snippet service 610 is included in a memory 114 of a server device 110 and executed by at least one processor 112 of the server device 110. The snippet service 610 is accessible by the query service 420 by way of the network 150.

In some embodiments, the query service 420 generates a request for a snippet that is transmitted to the snippet service

610. The request for a snippet can include a document identifier for a transcription document 225 that is included in the list of results, the query string 510 for a particular search query associated with the search result, and a jurisdiction identifier corresponding to the client application 104. The snippet service 610 retrieves a transcription document 225 from the distributed search platform 250 that corresponds to the document identifier.

As previously mentioned, snippets of transcription information are governed by copyright law and, as such, displaying a representation of the transcription information on a display device 126 of a client device 120 requires a license as long as the operation does not fall under the fair use doctrine. The transcription documents 225 are intentionally structured to enable the snippet service 610 to automatically return different representations of the transcription information based on the particular jurisdiction associated with the client device 120.

In some embodiments, the snippet service 610 pulls the transcription information from the transcription document 225 according to the jurisdiction identifier included in the request. The jurisdiction identifier for a particular client device 120 can be set when a user registers the client device 120 with a service provider, such as by registering a phone number or email address with the service provider and specifying a billing address associated with the client device 120. Alternatively, the client device 120 can determine a location of the client device 120 using, e.g., wireless network information such as a location of a nearby base station or an IP address of a wireless access point. In some embodiments, the client device 120 includes a location sensor, such as a GPS sensor, that can return the location of the client device 120 based on a received wireless signal. The location can be utilized to determine which jurisdiction the client device 120 is located within, such as a country, state, or other government entity. The client device 120 can be configured to map a current location, given by, e.g., GPS coordinates, to a jurisdiction identifier such as a two letter country code. The jurisdiction identifier can then be provided to the query service 420, which provides the jurisdiction identifier to the snippet service 610.

The snippet service 610 determines whether transcription information for the jurisdiction specified by the jurisdiction identifier is included within the transcription document 225. If transcription information for the jurisdiction is included in the transcription document 225, then the snippet service 610 retrieves the transcription information for the jurisdiction from the transcription document 225. Otherwise, the snippet service 610 retrieves the default transcription information from the transcription document 225.

The snippet service 610 then analyzes the transcription information based on the query string to determine the best match of the query string to a portion of the transcription information. In some embodiments, the snippet service 610 identifies locations of tokens in the transcription information that match tokens in the query string. The snippet service 610 then determines a portion of the transcription information that most closely matches the query string. Where the snippet service 610 identifies multiple portions that match the query string, then the snippet service 610 can find the best match based on, e.g., an order of the tokens and/or a distance between tokens in the portion of the transcription information.

In some cases, the snippet service 610 prioritizes portions of the transcription information that are repeated multiple times over other portions that are either not repeated or repeated less. For example, the snippet service 610 can prioritize snippets included in the chorus of a song that is repeated multiple times over snippets included in a verse of a song, which may only be included in the lyrics for a song once, even if the snippet that is repeated is slightly less of a good match based on order or distance of tokens in the portion of the transcription information.

In some cases, the snippet service 610 does not find a match to the query string within the transcription information. This can be the case where the document identifier for the transcription document 225 was returned in the list of results based on a match of the query string to one of the fields of metadata such as title or artist. In such cases, the snippet service 610 returns a portion of the transcription information that is most often repeated, such as a portion of the chorus of a song. Alternatively, the snippet service 610 returns a portion of the transcription information corresponding to a default snippet that is manually specified in the transcription information as provided by the publisher of the multimedia content or manually entered by a third party transcriber or the service provider of the service 220. In yet other cases, the snippet service 610 is configured to provide, as a default, a first portion of the transcription information.

As mentioned above, in cases where the service provider does not have a license to display the transcription information to a user within a given jurisdiction, the transcription information for that jurisdiction can be empty. In such cases, the snippet service 610 can be configured to return an empty snippet to the query service 420. Alternatively, the snippet service 610 can be configured to return a default snippet to the query service 420 that indicates the snippet cannot be displayed for reasons relating to copyrights (e.g., "The lyrics for this song are covered by copyright and cannot be displayed in [jurisdiction].").

In some embodiments, the query service 420 compiles snippets for the results in the list of results and adds the snippets to the representation of the search results returned to the client application 104 in the response to the search request. The snippets can be displayed proximate other information related to the result, such as underneath the title and artist of a song, to provide context to why the result was returned in response to the query string. In some embodiments, the tokens in the snippet that match the tokens in the query string are highlighted, such as by underlining the tokens, using a bold or italic font to display the tokens, or changing the color of the font for the tokens relative to the font utilized for the remainder of the tokens in the snippet.

Figure 7:
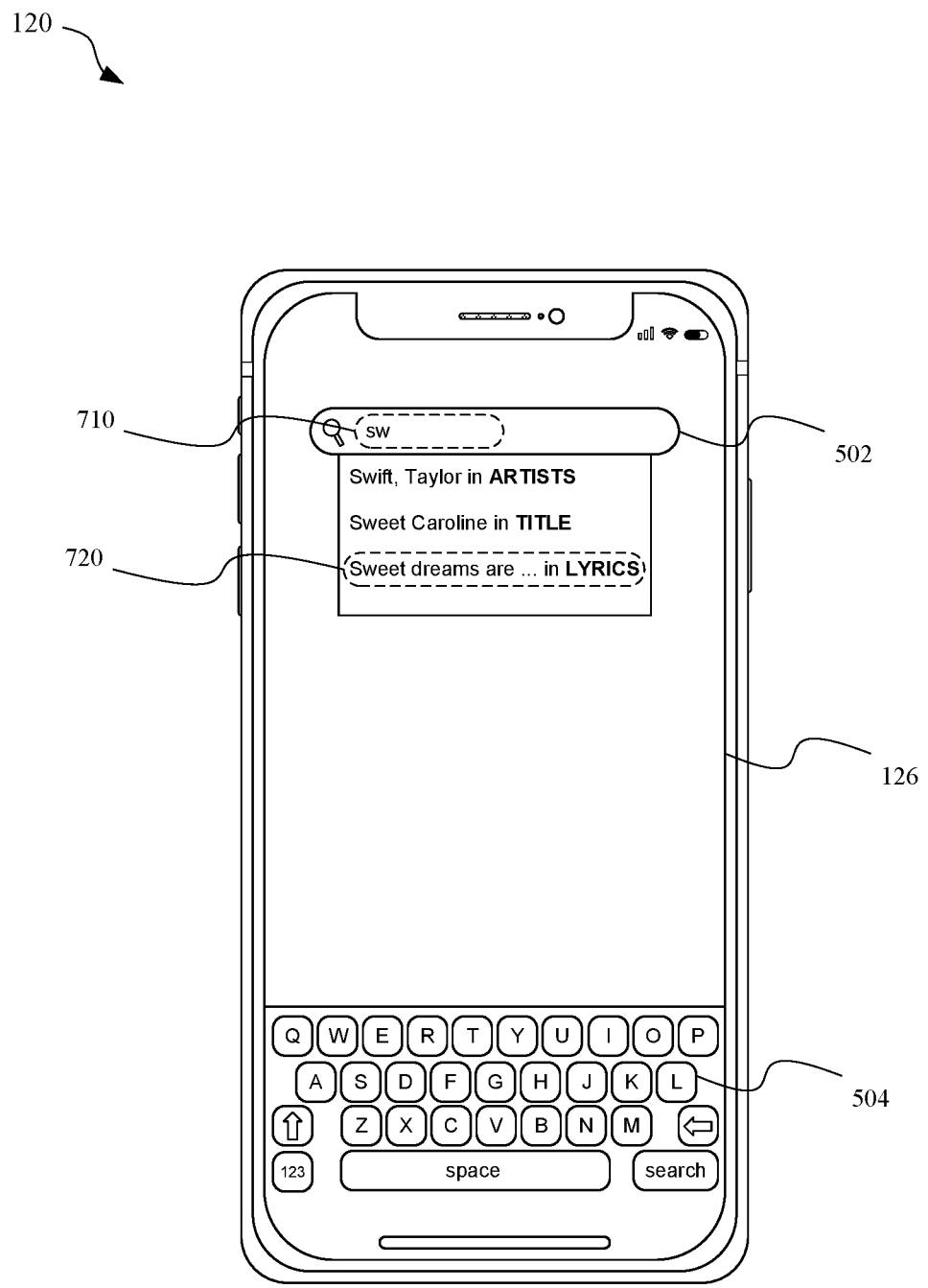
FIG. 7 illustrates search hints based on transcription information, in accordance with some embodiments.

FIG. 7 illustrates search hints based on transcription information, in accordance with some embodiments. Various client applications 104 are configured to provide a user with search hints 720 when the user is entering a query string 710 in the search query interface element 502. For example, search hints for a query string that starts with "sw" can return a first search hint for a popular artist that starts with the letters "sw", such as (Taylor) Swift, and a second search hint for a popular song title that starts with the letters "sw", such as Sweet Caroline. A new category of search hint, related to transcription information, can be provided to the client application 104.

As depicted in FIG. 7, the search hint 720 for transcription information includes at least a portion of a snippet matching the characters in the query string 710 entered in the search query interface element 502. The search hint 720 also includes an indication that the search hint is related to transcription information. For example, as depicted in FIG. 7, the search hint 720 can indicate the suggested search hint is associated with song lyrics.

Figure 8:
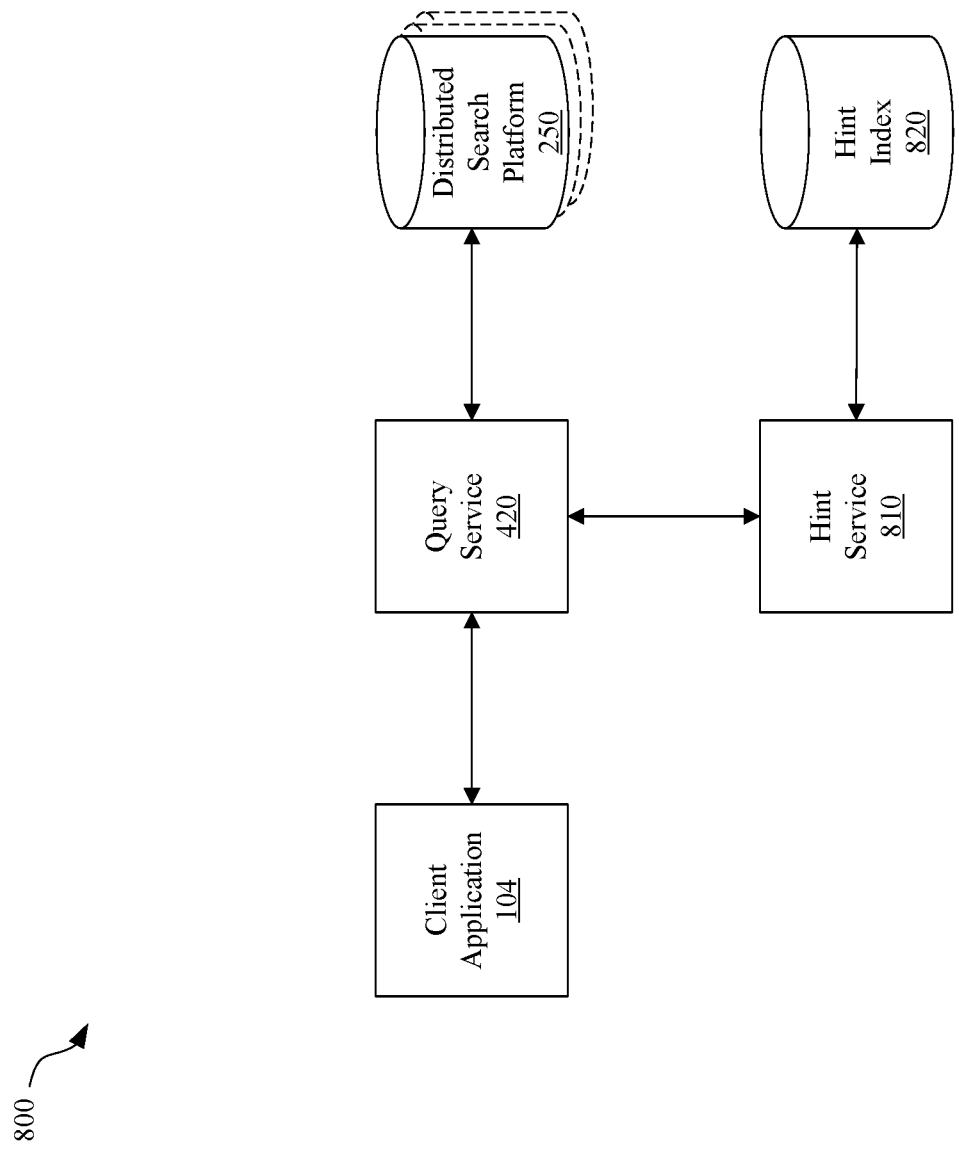
FIG. 8 illustrates a client-server architecture for generating search hints, in accordance with some embodiments.

FIG. 8 illustrates a client-server architecture 800 for generating search hints 720, in accordance with some embodiments. The client-server architecture 800 is similar to client-server architecture 400 except that a second, back-end service, the hint service 810, is utilized by the query service 420 to generate search hints. The hint service 810 is included in a memory 114 of a server device 110 and executed by at least one processor 112 of the server device 110. The hint service 810 is accessible by the query service 420 by way of the network 150.

In some embodiments, the query service 420 utilizes the feedback signal to determine which results are relevant to a given query string 510. The relevant result(s) and query string 510 are then transmitted to the hint service 810, which indexes the relevant result(s), within the hint index 820, according to the characters included in the query string 510. The result is indexed for each of a plurality of portions of the query string 510 found at the beginning of the query string 510, each portion having a different number of characters up to the maximum number of characters of the query string 510. Multiple results can be indexed, within the hint index 820 for each combination of characters based on a plurality of different feedback signals.

In some embodiments, the result can also be stored in an entry of the hint index 820 along with a frequency value that indicates the number of times the result was selected in response to a given query string 510. The frequency value is incremented each time the result is provided within a feedback signal to a corresponding query string 510. The frequency value can also be set to decay over a period of time such that the result will not be suggested as a search hint if the result has not been selected by at least one user recently.

For a given portion of the query string 710, the hint index 820 can return a list of results selected by users as indicated by feedback signals. The list of results can be sorted according to frequency value to determine the most frequently selected result for a given query string 510 that starts with the characters in query string 710. The top result can be returned to the query service 420 as a search hint 720. More specifically, for a search hint 720 related to transcription information, the query service 420 can call the snippet service 610 to retrieve a snippet from a referenced transcription document 225 indexed in the hint index 820 based on the portion of the query string 710 entered into the search query interface element 502. The snippet can then be displayed in the search hint.

In other embodiments, the service provider can analyze the feedback signal(s) provided by the client application(s) 104 to populate the hint index 820, manually. For example, a service provider can manually update the hint index 820 to return a particular result that is desired to be provided as the search hint for a given combination of characters by the service provider.

In some embodiments, the hint index 820 creates a different index for each of a plurality of different fields of the transcription document 225. The index for transcription information can simply store snippets displayed within a selected result as provided in the feedback signal rather than a reference identifier for a song document. Consequently, the query service 420, or, alternatively, the hint service 810 does not have to make a call to the snippet service 610 in order to generate a snippet related to the result to generate the search hint 720 for display by the client application 104.

Figure 9:
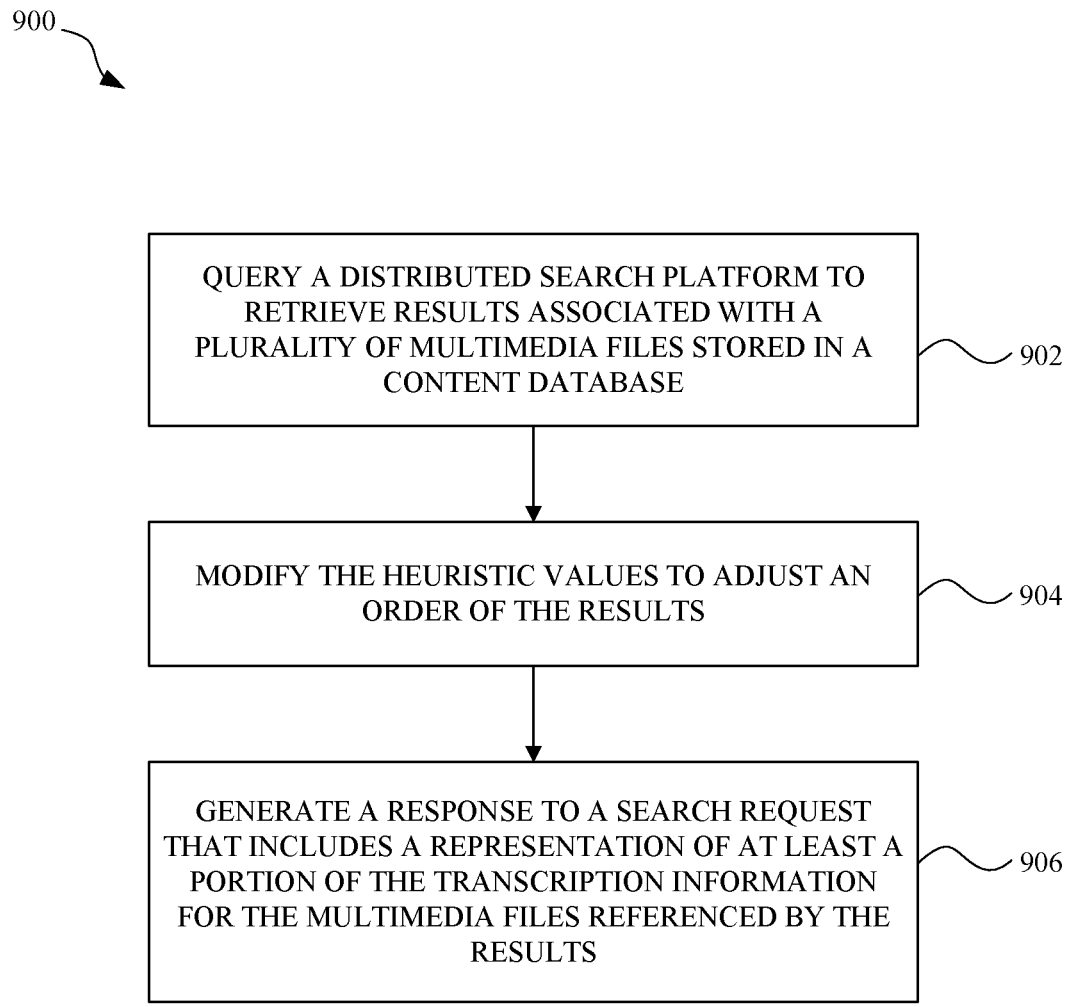
FIG. 9 is a flow chart of a method for querying transcription information related to multimedia content, in accordance with some embodiments.

FIG. 9 is a flow chart of a method 900 for querying transcription information related to multimedia content, in accordance with some embodiments. The method 900 is carried out, at least in part, by one or more server devices. The method 900 can be implemented by software, hardware, or a combination of software and hardware. In some embodiments, the method 900 is implemented by one or more of the client application 104, the query service 420, and/or the distributed search platform 250.

At 902, a distributed search platform is queried to retrieve results associated with a plurality of multimedia files stored in a content database. The results are ordered according to a plurality of heuristic values calculated based on a text relevance analysis. In some embodiments, the results comprise one or more lists of identifiers that reference corresponding transcription documents that include transcription information for the multimedia files. Each list of identifiers corresponds to a different index maintained by a distributed search platform for each of one or more fields of the transcription document.

At 904, the heuristic values are modified to adjust an order of the results. The heuristic value for a given result can be modified based on a field in the transcription document associated with the index that produced the result or, alternatively, modified based on a popularity score associated with the multimedia file specified by the result. In some embodiments, the heuristic values can be modified based on a relevance score determined based on feedback signals received from one or more client devices.

At 906, a response to a search request is generated that includes a representation of at least a portion of the transcription information of the multimedia files referenced by the results. The representation can include a snippet selected from the transcription information based on a query string.

Figure 10:
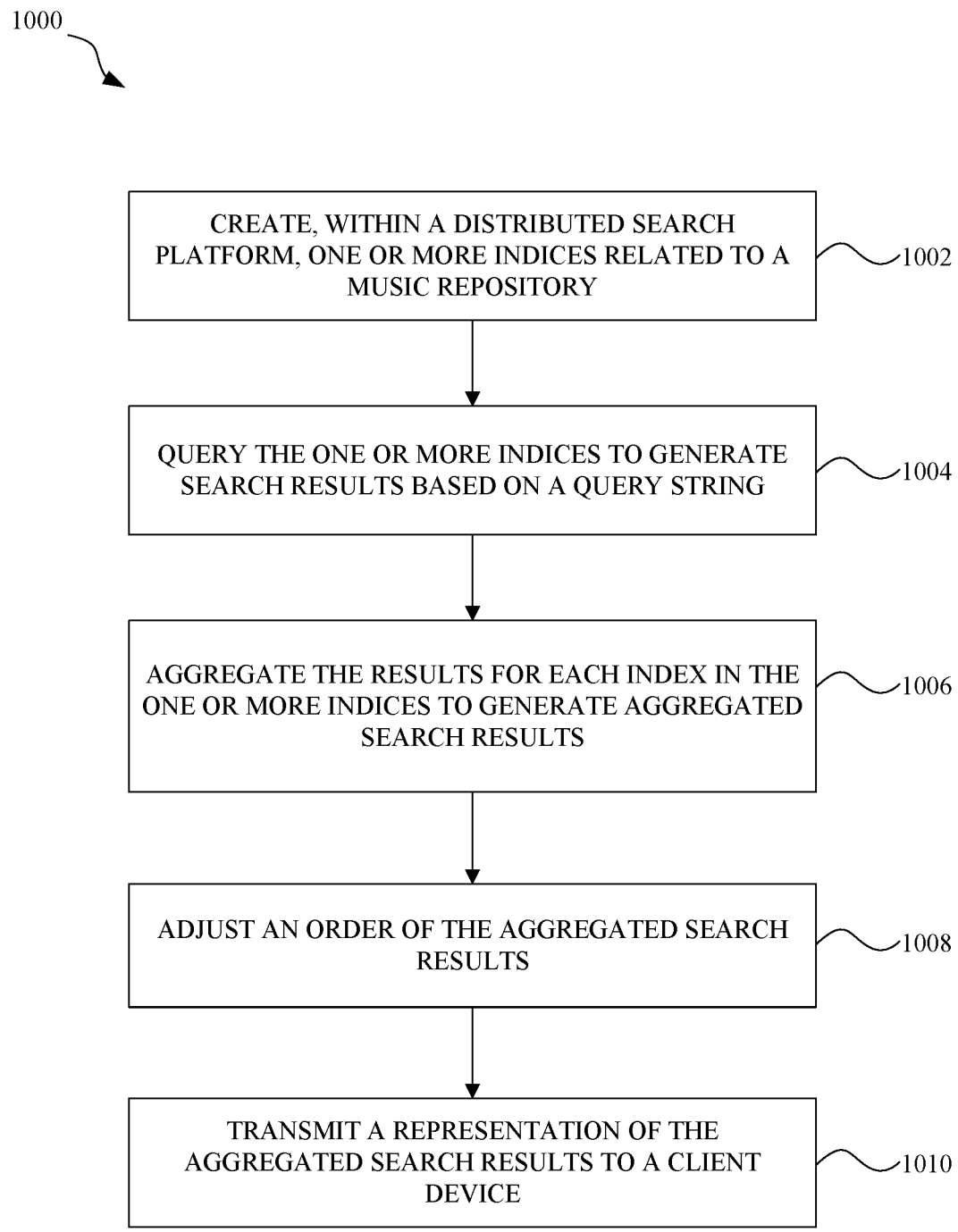
FIG. 10 is a flow chart of a method for querying transcription information related to multimedia content, in accordance with some embodiments.

FIG. 10 is a flow chart of a method 1000 for querying transcription information related to multimedia content, in accordance with some embodiments. The method 1000 is carried out, at least in part, by one or more server devices. The method 1000 can be implemented by software, hardware, or a combination of software and hardware. In some embodiments, the method 1000 is implemented by one or more of the client application 104, the query service 420, and/or the distributed search platform 250.

At 1002, one or more indices related to the music repository are created within a distributed search platform. At least one index maintained by the digital search platform is related to lyric data transcribed from the plurality of audio files.

At 1004, the one or more indices are queried to generate search results based on a query string. Each index can be queried separately to generate a list of results related to a particular field of a transcription document.

At 1006, the results for each index in the one or more indices are aggregated to generate aggregated search results.

At 1008, an order of the aggregated search results is adjusted. In some embodiments, the heuristic value for each result in the aggregated search results is modified by at least one of: a popularity score associated with corresponding audio files in the music repository; a weight associated with a particular field included in a transcription document for the audio file; or a relevance score calculated based on feedback signals.

At 1010, a representation of the aggregated search results is transmitted to a client device. The representation of the search results includes at least one snippet of the lyric data for one or more audio files.

Figure 11:
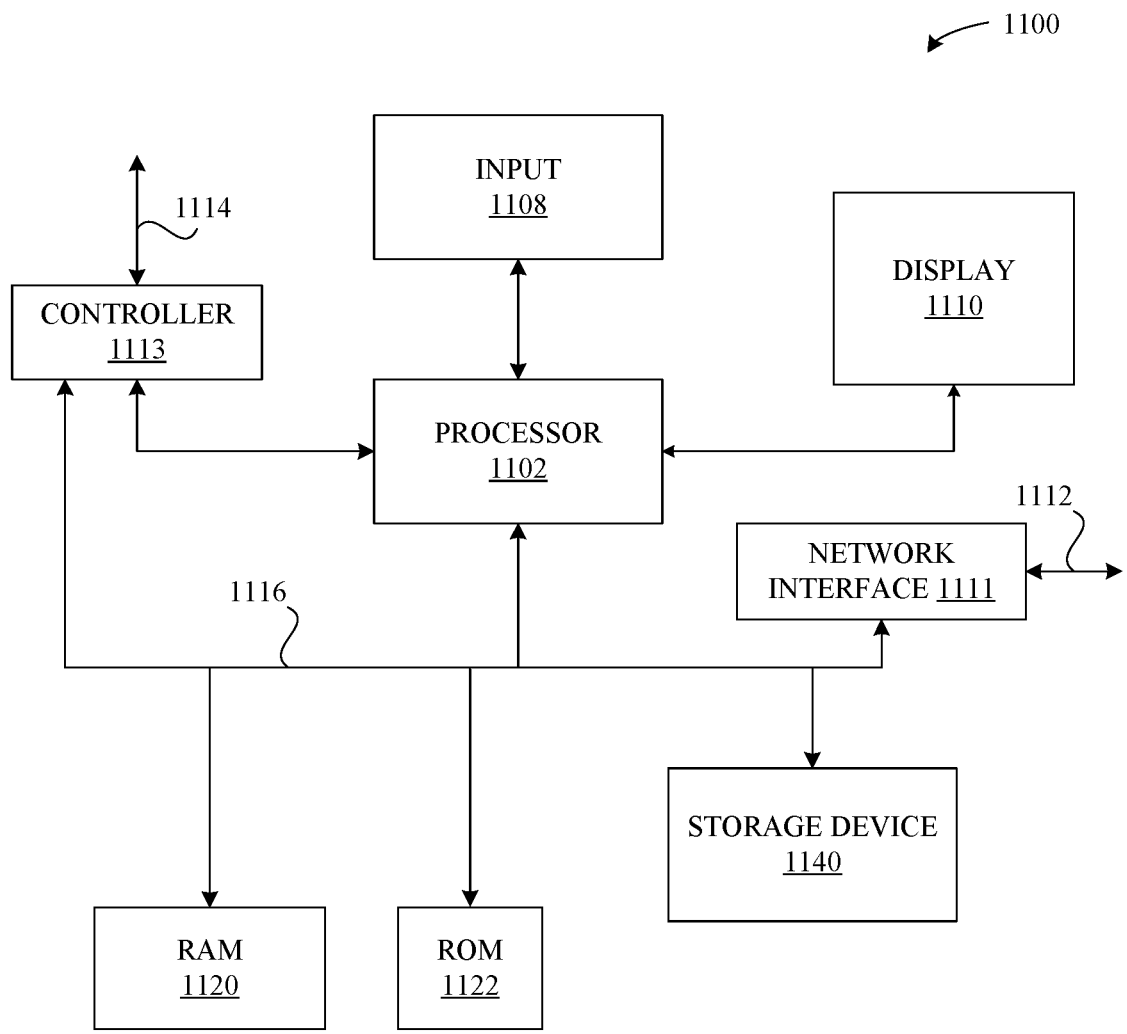
FIG. 11 illustrates a detailed view of an exemplary computing device that can be used to implement the various apparatus and/or methods described herein, in accordance with some embodiments.

FIG. 11 illustrates a detailed view of an exemplary computing device 1100 that can be used to implement the various apparatus and/or methods described herein, in accordance with some embodiments. In particular, the detailed view illustrates various components that can be included in the computing devices illustrated in FIGS. 1 through 9, and/or described herein. For example, the client device 120, server device 110, or any other device including any network devices and/or consumer electronics can include the components of computing device 1100.

As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 (screen display) that can be controlled by the processor 1102 to present visual information to the user. A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that couples to a data link 1112. In the case of a wireless connection, the network/bus interface 1111 can include a wireless transceiver.

The computing device 1100 also include a storage device 1140, which can comprise a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for querying transcription information related to a plurality of multimedia files, the method comprising, by at least one server device:
   querying a search platform to retrieve results associated with the plurality of multimedia files, wherein the results are ordered according to a plurality of heuristic values calculated based on a text relevance analysis;
   producing an adjusted order of the results by modifying the heuristic values for at least some of the results based on weights associated with fields included in transcription documents that correspond to the plurality of multimedia files; and
   generating a response to a search request according to the adjusted order that includes representations of one or more multimedia files.

2. The method of claim 1, wherein:
   each representation of a multimedia file includes at least a portion of transcription information that corresponds to the multimedia file, and
   the search platform calculates the heuristic values for at least some of the results by performing the text relevance analysis on the transcription information included in the at least some of the results based on one or more tokens in a query string.

3. The method of claim 2, wherein the text relevance analysis comprises calculating a measurement of a token frequency included in transcription information.

4. The method of claim 2, wherein the text relevance analysis comprises calculating a measurement of a term frequency — inverse document frequency (TF-IDF) for the transcription information.

5. The method of claim 2, wherein the text relevance analysis comprises calculating a measurement of a token proximity within the transcription information.

6. The method of claim 2, wherein the transcription information comprises song lyrics for audio files, and wherein the heuristic values for at least some of the results are modified based on weights associated with a particular field of the respective transcription document that corresponds to each audio file.

7. The method of claim 2, wherein the response to the search request includes a representation of a snippet of the transcription information that is selected based on the query string.

8. The method of claim 1, wherein the heuristic values for at least some of the results are modified based on a popularity score for corresponding multimedia files.

9. The method of claim 1, further comprising:
   transmitting the response to the search request to a client device.

10. The method of claim 9, further comprising:
    receiving a feedback signal from the client device.

11. The method of claim 10, wherein the feedback signal is utilized to compile a hint index that can be queried to generate a search hint to display in a graphical user interface of the client device.

12. The method of claim 11, wherein the search hint includes a snippet of the transcription information and an indication that the search hint is related to transcription information for the plurality of multimedia files.

13. The method of claim 1, wherein, for a given field of the fields included in a transcription document that corresponds to a given multimedia file of the plurality of multimedia files, the associated weight indicates a respective importance of the given field relative to other weights associated with other fields included in the transcription document.

14. At least one non-transitory computer readable storage medium configured to store instructions that, in response to being executed by at least one processor included in a server device, cause the server device to query lyric data related to a plurality of audio files associated with a music repository, by carrying out steps that include:
creating, within a search platform, one or more indices related to the music repository, wherein the one or more indices include at least one index related to lyric data transcribed from the plurality of audio files;
querying the one or more indices to generate search results based on a query string;
adjusting an order of the search results to produce an adjusted order; and
transmitting a representation of the search results to a client device, wherein the representation of the search results is generated according to the adjusted order.

15. The at least one non-transitory computer readable storage medium of claim 14, wherein the order of the search results are adjusted based on at least one of:
a popularity score associated with corresponding audio files in the music repository;
a weight associated with a particular field of a transcription document that includes the lyric data for a particular result; or a relevance score calculated based on one or more feedback signal associated with previous search queries of the music repository.

16. The at least one non-transitory computer readable storage medium of claim 14, wherein the search results are aggregated based on a first query of the at least one index related to lyric data and one or more additional queries of additional indices related to fields of metadata in the plurality of audio files.

17. The at least one non-transitory computer readable storage medium of claim 14, wherein:
the representation includes at least one snippet of the lyric data for one or more audio files, and
each snippet is generated based on a text relevance analysis of the lyric data for a corresponding audio file relative to the query string.

18. A server device for querying transcription information related to a plurality of multimedia files stored in a content database, the server device comprising:
at least one processor; and
at least one memory storing instructions that, when executed by the at least one processor, cause the server device to:
receive a search request that includes a query string from a client device;
generate a query for one or more indices of a search platform based on the query string;
receive a list of search results from the search platform, wherein the list of search results includes, for each search result in the list of search results, a document identifier for a transcription document stored in the search platform and a corresponding heuristic value calculated based, at least in part, on a comparison of the query string with values from one or more fields of the transcription document specified by the document identifier;
modify an order of the search results in the list of search results based on at least one of a popularity score for the multimedia files or a weight associated with each field in the one or more fields of the transcription document; and
transmit a response to the search request to the client device, wherein the response includes a representation of at least one multimedia file that is generated based on the modified order of the search results.

19. The server device of claim 18, wherein the representation includes at least a portion of the transcription information for the at least one multimedia file.

20. The server device of claim 18, wherein the client device is configured to provide a feedback signal to the server device that indicates which result or results in the list of search results were selected by a user of the client device in response to displaying the representation within a graphical user interface of a client application.

* * * * *